(12) United States Patent
Crossley

(10) Patent No.: US 10,047,226 B2
(45) Date of Patent: Aug. 14, 2018

(54) PROVISION OF INORGANIC POWDERS WITH REDUCED HAZARD

(71) Applicant: William Blythe Limited, Accrington (GB)

(72) Inventor: David Christopher Crossley, Clitheroe (GB)

(*) Notice: Subject to any disclaimer, the term of this patent is extended or adjusted under 35 U.S.C. 154(b) by 87 days.

(21) Appl. No.: 15/162,542

(22) Filed: May 23, 2016

(65) Prior Publication Data

US 2016/0340479 A1 Nov. 24, 2016

(51) Int. Cl.
*C08J 3/12* (2006.01)
*C09C 3/12* (2006.01)
*C08J 3/20* (2006.01)
*C08J 3/22* (2006.01)

(52) U.S. Cl.
CPC .............. *C09C 3/12* (2013.01); *C08J 3/12* (2013.01); *C08J 3/201* (2013.01); *C08J 3/226* (2013.01); *C08J 2423/12* (2013.01)

(58) Field of Classification Search
CPC ... C08J 3/12; C08J 3/201; C08J 3/226; C08K 3/16; C08K 5/5419; C08K 9/06; C08K 9/10
See application file for complete search history.

(56) References Cited

U.S. PATENT DOCUMENTS 4,778,834 A   8/1988   Murray

FOREIGN PATENT DOCUMENTS

| CN | 101880408 | 11/2010 |
|---|---|---|
| CN | 102658179 | 9/2012 |
| CN | 104497495 | 4/2015 |
| GB | 2489123 A | 9/2012 |
| RU | 2337111 | 10/2008 |
| RU | 2439084 | 1/2012 |
| WO | 2011081746 | 7/2011 |

OTHER PUBLICATIONS

UKIPO Combined Search and Examination Report (attached).

*Primary Examiner* — Edward J Cain
(74) *Attorney, Agent, or Firm* — AdamsIP, LLC; Stephen Thompson; J. Hunter Adams

(57) ABSTRACT

Provision of inorganic powders with reduced hazard: acid chlorides which have use in polymer production can be incorporated into a masterbatch with the addition of a silane compound to reduce the corrosiveness of the masterbatch pellets and reduce variability of pellet size. This presents advantages in transport and handling costs and facilitates downstream processing.

9 Claims, 1 Drawing Sheet

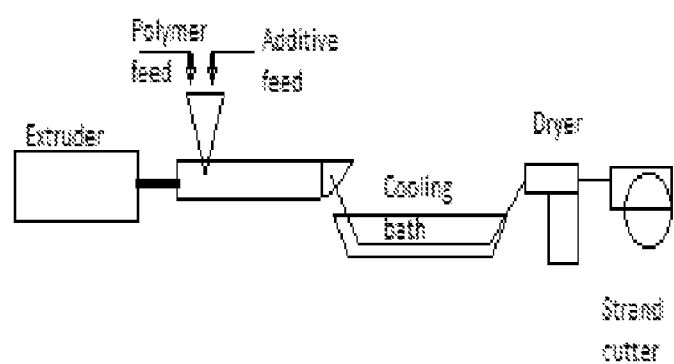

PROVISION OF INORGANIC POWDERS WITH REDUCED HAZARD

CROSS REFERENCES

This application claims the benefit of Great Britain Patent Application No. GB 1508806.5, filed on May 22, 2015, which application is incorporated herein by reference.

FIELD OF THE INVENTION

The present invention relates to the provision of inorganic powders with reduced hazard. In particular, acid chlorides are useful in a number of processes, such as plastics production; however, they have limitations in terms of handling, particularly manual handling because of issues such as corrosiveness, irritancy and dusting.

BACKGROUND

A number of inorganic compounds, described herein as acid chlorides have wide utility. Examples of these materials include magnesium chloride, aluminium chloride, silicon chloride, phosphorus chloride and stannous chloride. A common feature for these materials, with the exception of magnesium chloride, is that when in contact with water they dissociate and liberate hydrochloric acid. The basic reactions are summarised below:

Dissolution of Magnesium Chloride in water:

$$MgCl_{2(s)} + 6H_2O_{(l)} \rightarrow [Mg(H_2O)_6]^{2+}_{(aq)} + 2Cl^-_{(aq)}$$

$$[Mg(H_2O)_6]^{2+}_{(aq)} + H_2O_{(l)} \rightleftharpoons [Mg(H_2O)_5(OH)]^+_{(aq)} + H_3O^+_{(aq)}$$

Reaction of Aluminium Chloride with water:

$$AlCl_{3(s)} + 3H_2O_{(l)} \rightarrow [Al(OH)_3]_{(s)} + 3HCl_{(g)}$$

Reaction of Phosphorous (V) Chloride with water:

$$PCl_5 + H_2O \rightarrow POCl_3 + 2HCl$$

Reaction of Stannous Chloride with water:

$$SnCl_2 + H_2O \rightarrow Sn(OH)Cl + HCl$$

The above acid chlorides can be incorporated into polymer processing by means of first producing a so-termed masterbatch. A masterbatch is a high concentration combination of a base polymer with an additive, such as the aforementioned acid chlorides. A masterbatch may then be introduced into a further polymer production process so as to liberate the additive, so as to, for example, initiate a chemical reaction.

A masterbatch is typically produced by contacting a molten resin or polymer with the required additives in the correct concentration before mixing, and subsequently the mixture is extruded to form solid pellets. The aim of the process is to provide pellets with a uniform concentration of additive dispersed through them; the pellets can be easily handled by plastics manufacturers and incorporated into their production. Production may be batchwise or continuous depending on the equipment and volume. When dealing with chemically reactive masterbatch components, such as the acid chlorides, it is preferable that the masterbatch is primarily a mixture of a relatively unreactive polymer, such as polyethylene or polypropylene, even if this polymer is not the primary polymer into which the masterbatch is subsequently incorporated.

One specific example of a reactive masterbatch using an acid chloride is in the polymerisation of rubbers, such as EPDM rubber in which a masterbatch comprising stannous chloride is introduced. This facilitates cross-linking between molecules in order to obtain desired properties. The incorporation of stannous chloride in a masterbatch is described in patent GB 2489123, and the use of a stannous chloride masterbatch as the catalyst in curing thermoplastic vulcanisate in WO2011081746. Aluminium chloride is used as a catalyst in rubber production, as taught by the patents RU2337111 and RU2439084.

The use of a masterbatch as mentioned above has utility in that a friable and potentially dusty acid chloride can be entrained in the masterbatch polymer and its availability to the environment reduced. This is particularly useful in reducing dusting and general handleability improvement. However, as mentioned previously the purpose of a masterbatch is to introduce an additive in a high concentration form into a further process. It is therefore generally disadvantageous to incorporate more masterbatch polymer (the polymer primarily constituting the masterbatch) than absolutely necessary. However, as increasing loadings of additive, such as the acid chloride, are included in the masterbatch the ability of the masterbatch polymer to fully encapsulate the additive reduces.

An ongoing problem with masterbatch comprising acid chlorides is that when contacted with water, such as moisture from the hands of a person handling the masterbatch, acid can be released and this has a corrosive effect leading to health and safety problems. By example, a stannous chloride masterbatch as described earlier remains corrosive and is classified as such for transport, resulting in additional handling costs.

It is therefore one object of the present invention to provide an acid chloride masterbatch having reduced corrosivity.

A further issue with high loading of additive in a masterbatch is that a masterbatch is typically provided as a pelletised material, such as an extrudate which is chopped into pellets, one example being an extrudate chopped into pellets at increased temperature so as to give a degree of spheronisation to the masterbatch. It is generally advantageous that masterbatch particles and particles in general for polymerisation should be monodisperse and additionally spherical. A mono dispersed particle is less likely to give rise to flow problems and particle segregation. Spherical particles also provide improved flow.

It is therefore a further object of the present invention to provide a masterbatch having improved flow characteristics.

Problems addressed by the present invention therefore include: the dust formation that is typically a hazard when loading inorganic chloride powders into vessels is reduced, the corrosiveness of the product is reduced, and finally the product can be easily introduced into resin, polymer, and plastics production at the correct dosage, in a form that is readily mixed with the other components.

The immobilisation of acid chlorides more generally is known.

Chinese patent CN102658179, discloses a preparation method of stannous chloride immobilized catalyst, teaches a better method of immobilizing stannous chloride onto an inorganic porous carrier in order for it to be used as a catalyst in fixed bed reactions. The patent describes how to fix the gaseous stannous chloride onto the porous inorganic support. Although this patent teaches how to reduce the corrosiveness of this catalyst, the end use is not in the same field and the catalyst is fixed onto an inorganic porous structure rather than into an organic polymer matrix as in the current application.

The present invention provides a coated inorganic acid chloride having an organosilane coating such as derived by reacting the inorganic acid chloride reacted with an organosilane.

SUMMARY

In a first aspect of the present invention, there is provided a composition, the composition comprising an acid chloride having an organosilane coating. The composition of the present invention preferably comprises a polymer matrix such as to provide a masterbatch for delivery of organosilane coated acid chloride into a polymer processing process.

The acid chloride of the present invention is an inorganic acid chloride and is specifically limited to Stannous Chloride.

A further aspect of the present invention provides a process, such as for provision of the composition of the first aspect, wherein the process provides a process for combining acid chlorides with a silane compound and a process for producing a masterbatch containing the organosilane coated acid chloride.

A preferred end use of acid chlorides is in the masterbatch form mentioned above, this form requiring first the preparation of the acid chloride, the modification of the acid chloride with the organosilane coating, and subsequent incorporation into the masterbatch. It has been surprisingly found that a one-step reaction process can take place in which a suitable masterbatch can be prepared in which the silane compound is combined with the acid chloride directly into the masterbatch preparation. Another embodiment for using the organosilane coated acid chloride masterbatch is to make vulcanized rubber products.

The following disclosure will first consider the acid chlorides that may be incorporated into the masterbatch. Secondly, the disclosure will consider the silane compounds that can be used to react with the acid chloride such that the masterbatch in its pellet form is not corrosive, and can be used to produce thermoelastomer products (such as EPDM rubber) with the desired qualities. Three processes for making the acid chloride masterbatch will be disclosed.

DESCRIPTION OF THE DRAWINGS

These and other features, aspects, and advantages of the present invention will become better understood with regard to the following description, appended claims, and accompanying drawings where:

FIG. 1 shows a top perspective view of an apparatus embodying features of the present invention.

DETAILED DESCRIPTION

The present invention in its various aspects is as set out in the appended claims.

In a first aspect of the present invention, there is provided a composition, the composition comprising an acid chloride having an organosilane coating. The composition of the present invention preferably comprises a polymer matrix such as to provide a masterbatch for delivery of organosilane coated acid chloride into a polymer processing process.

The acid chloride of the present invention is an inorganic acid chloride and is specifically limited to Stannous Chloride.

A further aspect of the present invention provides a process, such as for provision of the composition of the first aspect, wherein the process provides a process for combining acid chlorides with a silane compound and a process for producing a masterbatch containing the organosilane coated acid chloride.

A preferred end use of acid chlorides is in the masterbatch form mentioned above, this form requiring first the preparation of the acid chloride, the modification of the acid chloride with the organosilane coating, and subsequent incorporation into the masterbatch. It has been surprisingly found that a one-step reaction process can take place in which a suitable masterbatch can be prepared in which the silane compound is combined with the acid chloride directly into the masterbatch preparation. Another embodiment for using the organosilane coated acid chloride masterbatch is to make vulcanized rubber products.

The following disclosure will first consider the acid chlorides that may be incorporated into the masterbatch. Secondly, the disclosure will consider the silane compounds that can be used to react with the acid chloride such that the masterbatch in its pellet form is not corrosive, and can be used to produce thermoelastomer products (such as EPDM rubber) with the desired qualities. Three processes for making the acid chloride masterbatch will be disclosed.

Acid Chlorides

The inorganic powder incorporated into the masterbatch is an acid chloride, wherein the acid chloride is stannous chloride.

It is understood that levels of impurities at a level of less than 2%, and more preferably less than 1%, are present in the acid chloride. When the acid chloride is stannous chloride, the stannous chloride preferably comprises a coating of a tin oxide, such as stannous oxide. This provides improved acid chloride stability and reduced irritancy potential for the composition, such as when the composition is in a humid atmosphere.

The acid chloride as Stannous Chloride is preferably in a particulate form, with the particles having an approximate average diameter of about 10 to 500 μm average size, and more preferably of about 30 to 300 μm average size. The size measure is a D4,3 measure using a Malvern Mastersizer particle size analyser.

Silane Compounds

Silane compounds that have been found as effective to successfully reduce the amount of tin leached from a masterbatch are of two types: alkoxy silanes with an alkoxy silane group associated with a methyl group, and silane coupling agents where the alkoxy silane group is associated with another reactive functional group such as a vinyl, epoxy or amino or mercapto group. These two types of silane compounds will be described respectively herein as non-functional and functional silane compounds.

Non-functional silane compounds that have been found as effective to successfully reduce the amount of tin leached from a masterbatch, have the generic formula:

$$(R'O)x\text{-Si}\text{—}Ry$$

wherein y is 1 to 3, x is 4-y; R is a $C_1$ to $C_{18}$ hydrocarbon, and R' is methyl or ethyl. x is preferably 2 or 3, and more preferably 3. Y is preferably 1 or 2, and preferably 1. R' is preferably ethyl. When y is 2 then R may be identical or may be R' being a hydrocarbon of different structure of $C_1$ to $C_{18}$.

Preferred silane structures are $(C_2H_5O)_3Si\text{—}R$, $(CH_3O)_3Si\text{—}R$, $(C_2H_5O)_2Si\text{—}R\ R'_1$, $(CH_3O)_2Si\text{—}R\ R'$, $(C_2H_5O)_3\ Si\text{—}R\text{—}Si(C_2H_5O)_3$, $(CH_3)_3\ Si\text{—}R\text{—}Si(CH_3O)_3$, where R is an alkyl group with 1 to 18 carbons. R and R' are more preferably with 6 to 18 carbons.

These compounds are available from commercial suppliers.

Functional silane compounds that have also been found to be effective have the following generic formula (R'O)x(R''')y Si—(R—O)z—R'' wherein y is 0 to 2, x is 3-y; x is preferably 2 or 3, and more preferably 3,
wherein z is 0 or 1,
R is a $C_1$ to $C_{18}$ hydrocarbon, wherein the hydrocarbon is preferably an alkyl, R' is methyl or ethyl, and preferably ethyl,
R'' is a $C_1$ to $C_{18}$ hydrocarbon, wherein the hydrocarbon is preferably an alkyl, and R''' is a $C_1$ to $C_6$ alkyl group, preferably a methyl or ethyl group.

Preferred functional silane structures are $(CH_3O)_3$ Si R O R'', $(C_2H_5O)_3$ Si R O R'', $(CH_3O)_2R'$ Si R O R'', $(C_2H_5O)_2$ R' Si R O R''
Where R is an alkyl group containing 2 to 4 carbons, R' is an ethyl or methyl group and R'' is a functional group of type vinyl, epoxide, amine or mercapto type.

These compounds are available from commercial suppliers.

Suitable functional silane compounds have functional groups of type: vinyl, epoxide, amine or mercapto. Suitable vinyl silane compounds are: vinyltrimethoxysilane and vinyltriethoxysilane; suitable epoxide silane compounds: 2-(3,4 epoxycyclohexyl) ethyltrimethoxysilane, 3-glycidoxypropyl methyldimethoxysilane, 3-glycidoxypropyl trimethoxysilane, 3-glycidoxypropyl methyldiethoxysilane, 3-glycidoxypropyl triethoxysilane; suitable amino silane compounds: N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, partial hydrolyzates of 3-triethoxysilyl-N-(1,3 dimethyl-butylidene) propylamine, N-(vinylbenzyl)-2-aminoethyl-3-aminopropyltirmethoxysilan hydrochloride, N-(vinylbenzyl)-2-aminoethyl-3-aminopropyltrimethoxysilane hydrochloride, hydrolysate; suitable mercapto silane compounds: 3-mercaptopropylmethyldimehtoxysilane, 3-mercaptopropyltrimethoxysilane.

Epoxy functionalised silane—this has unexpectedly been found to give a good admixture of the acid chloride with hydrophobic polymers such as polyethylene and polypropylene, with concomitant advantages due to the non-reactivity of those masterbatch polymers whilst also giving compatibility with end-use polymers into which the masterbatch may be incorporated such as ABS, EPDM rubber and other thermoplastic vulcanisates.

More preferred of the silanes disclosed herein are: methyltrimethoxysilane, dimethyldimethoxysilane, phenyltrimethoxysilane, methyltriethoxysilane, dimethyldiethoxysilane, phenyltriethoxysilane, n-propyltrimethoxysilane, hexyltrimethoxysilane, octyltriethoxysilane, decyltrimethoxysilane, 1-6 bis (trimethoxysilyl)hexane, trifluropropyltrimethoxysilane. Most preferred is octyltriethoxysilane.

One of the important features of these silane compounds for the present invention is, for the embodiment where the inorganic acid chloride powder is coated before introduction in the masterbatch, is their ability to coat and bind with the powder.

Description of Reaction

The silane compound undergoes hydrolysis to form a silanol. For example:

$(C_2H_5O)_3Si—R+3H_2O \rightarrow (HO)_3Si—R+3C_2H_5OH$

Then, the silanol forms hydrogen bonds with the hydroxyl groups on the acid chloride.

Whilst not wishing to be bound by theory chemical bonds could be formed between the silanol and the acid chloride after drying.

However, it is also possible there is likely to be a layer of stannous or stannic oxide on the outside of the stannous chloride, or that localised decomposition of the stannous chloride to stannous hydroxide occurs, such as on contact of water with the stannous chloride during the reaction procedure. More generally metals that form hydrolytically stable surface oxides, e.g. aluminium, tin, titanium may react in this way. These oxidized surfaces tend to have sufficient hydroxyl functionality to allow coupling to the extent required by the invention. A representative reaction for the coupling of silane to metal chloride, in this example, stannous chloride is:

$(HO)_3Si—R+3SnCl_2.OH \rightarrow (SnCl_2O)_3Si—R+3H_2O$ or possibly $(OH)_3Si—R+3SnClOH \rightarrow (SnClO)_3Si—R+3H_2O$ It is therefore preferable that the metal chloride be specifically surface modified to provide such an oxidised surface coating.

As demonstrated by the equation above, the selection of the alkoxy group will determine the alcohol produced on hydrolysis of the silane compound. It is preferable for the alkoxy group of the silane compound to be of ethoxy type in order that the alcohol produced is ethanol, this being less toxic than methanol.

Polymer Resin

Suitable masterbatch polymers are thermoplastic polymers including solid, generally high molecular weight plastic resins such as crystalline, semi-crystalline, and crystallisable polyolefins, olefin copolymers, and non-olefin resins.

More preferable masterbatch polymers include polymers, in particular acrylonitrile butadiene styrene, polybutylene terephthalate, polyethylene terephthalate, polyoxymethylene, urethane, nylon, polycarbonate, PVC, acrylic, polystyrene, polypropylene and polyethylene.

Most preferably the masterbatch polymers are: polyethylene or polypropylene. These provide an unreactive but fluid matrix with a low surface energy compatible with a low surface energy silane.

The masterbatch of the invention may comprise from about 1 to 80% Stannous Chloride by weight, preferably from about 30 to 70% by weight. The invention thus permits the introduction of a high concentration of the corrosive material Stannous Chloride into a polymer preparation process by using the concentrated materbatch composition but in a form which is handleable without significant creation of acid (such as hydrochloric acid from Stannous Chloride) and thus provides a safer and substantially dust free method of addition. Such as may be desirable in for example EPDM rubber production.

A number of methods of carrying out the present invention so as to silanate an acid chloride are within the scope of the present invention suitable methods are as follows:

Description of the General Method of the Invention in Terms of an Initial Step of Hydrolysing the Silane before Pre-mixing the Stannous Chloride with the Silane before the Masterbatch Production An ethanol water solution is acidified to pH 5 using an acid, such as acetic acid. The silane compound is added to the solution and mixed. The silane compound is given time to hydrolyse. The acid chloride powder is charged to a suitable contacting vessel and the hydrolysed silane solution is added to the powder and mixed in order to contact the powder and the silane. The powder is then dried at 110° C. to 120° C. The dried silane-bonded acid chloride powder is then incorporated into the masterbatch.

The masterbatch can be prepared using the extruder equipment shown in FIG. 1. The method is described based on this diagram.

The masterbatch polymer is fed to the extruder via a feeder which controls the amount added. The extruder melts the polymer. The silane bonded acid chloride is fed to the extruder via a different feeder which controls the quantity added. As the molten masterbatch polymer and the silane bonded acid chloride progress along the screw or screws of the extruder they are mixed until the mixture is substantially homogeneous. The extrudate then passes through a bath of water or sodium hydroxide before being cut into pellets.

Description of the General Method of the Invention in Terms of Pre-mixing the Stannous Chloride with the Silane before the Masterbatch Production The acid chloride powder is charged to a suitable contacting vessel and the agitation of the vessel started. The silane compound is then added to the vessel, ideally through a spray nozzle, while the vessel's agitation is running. The silane compound and acid mixture chloride is mixed further to allow all the powder to be contacted. The powder is then dried at about 110° C. to 120° C. The dried silane-coated acid chloride powder is then incorporated into the masterbatch.

The masterbatch can be prepared using the extruder equipment shown in FIG. 1. The method is described based on this diagram.

The masterbatch polymer is fed to the extruder via a feeder which controls the amount added. The extruder melts the polymer. The silane-bonded acid chloride is fed to the extruder via a different feeder which controls the amount added. As the molten masterbatch polymer and the silane bonded acid chloride progress along the screw or screws of the extruder they are mixed until the mixture is substantially homogeneous. The extrudate then passes through a bath of water or sodium hydroxide before being cut into pellets.

Description of the General Method of the Invention in Terms of Extrusion Apparatus with Co-injection of Silane The masterbatch polymer is fed to the extruder via a feeder which controls the amount added. The extruder melts the polymer. The acid chloride is fed to the extruder via a different feeder which controls the amount added and finally the silane compound is fed to the extruder by a feeder that controls the quantity and rate. As the molten masterbatch polymer, silane compound and acid chloride progress along the screw or screws of the extruder they are mixed and the silane compound reacts with the acid chloride. A vent located after the first extruder screw allows venting of the ethanol or methanol resulting from the reaction before a second screw section. The extrudate then passes through a bath of water or sodium hydroxide before being cut into pellets.

In this embodiment, the silane compounds that is selected must have a boiling point that is compatible with the extrusion conditions. The extrusion temperature profile of the most preferable masterbatch polymers, polypropylene and polyethylene, lies between about 130° C. and 290° C. depending on the particular grade of the chosen material. Selection of the silane compound for co-injection from those listed above should particularly take into account this temperature, selecting a compound with a boiling point above the extruder temperature profile in the reaction zone.

EXAMPLES

Example 1

This non-limiting example describes the method of manufacture of acidic chlorides in a two-stage process where the silane is first combined with the inorganic acid chloride, prior to blending with the masterbatch polymer. This particular example describes the conditions required for producing a masterbatch containing Tin (II) Chloride or Stannous Chloride encapsulated in a resin carrier.

1000 g Anhydrous stannous chloride was charged to a rotary evaporator equipped with an agitator. 5g of n-octyl-methoxylsilane was added as well as a small amount of deionised water. After agitation the mixture was dried in an oven at about 110° C. A masterbatch was prepared on extrusion equipment using polypropylene as the masterbatch polymer with a loading of about 45% silane-bonded stannous chloride. The extrudate was face cut under water.

Particle Size Distribution

One unexpected advantage of the silanation of the acid chloride in the polymer masterbatch is a reduction of the pellet size and an improvement in the size distribution. These offer advantages because smaller, more reproducible pellets facilitate mixing and dosing in the downstream process. The following table shows the pellet sizes from two batches of stannous chloride masterbatch: the first batch prepared with stannous chloride, an organosilane-n-octyltrimethoxysilane and polypropylene and the second batch prepared with stannous chloride and polypropylene.

TABLE 1

Stannous Chloride masterbatch pellet size

| | Stannous chloride + oxysilane masterbatch | Standard stannous chloride masterbatch |
|---|---|---|
| Pellet size (raw date in mm) | 2.0, 2.0, 2.2, 2.0, 2.0, 3.0 1.8, 2.0, 2.0, 2.0, 2.0, 2.0 2.1, 2.0, 1.9, 2.0, 2.0, 1.9 2.0, 2.0, 1.9, 2.0, 2.8 2.0, 2.0, 2.3, 2.0, 2.2 2.0, 1.9, 2.0, 2.0, 2.0 1.9, 2.0, 1.9, 1.8, 2.0 1.9, 1.9, 1.8, 1.7, 1.9 1.8, 1.9, 1.9, 2.0, 2.0 2.0, 1.8 | 3.0, 3.0, 3.3, 2.2, 2.1, 2.8 3.2, 3.0, 3.2, 3.0, 2.9, 3.1 3.0, 3.1, 2.9, 2.8, 2.7, 3.2 3.5, 1.9, 3.0, 3.7, 3.9, 2.9 2.8, 2.9, 3.0, 2.9, 2.8, 2.9 2.9, 2.7, 3.0, 2.5, 1.9, 3.7 2.7, 3.0, 2.6, 2.9, 2.9, 2.2 2.9, 3.0, 2.6, 3.0, 2.9 2.2, 2.1, 2.8 |
| Mean (mm) | 2.0040 | 2.8640 |
| Standard Deviation | 0.2128 | 0.4154 |
| 95% confidence intervals for mean (mm) | 1.9435 2.0645 | 2.7459 2.9821 |

It can be clearly seen from the data set out above that the mean has been reduced by 0.86 mm or by 0.68 mm taking into account the least favourable 95% confidence interval for the mean. The standard deviation has been halved. Whilst not wishing to be bound by theory it is understood that the surface tension of the molten masterbatch is increased and the particles are therefore more readily able to spheronise.

Example 2

In order to test the corrosiveness of the pellets, the following test method was used based on the United Nations C1 Method "Test for determining the corrosive properties of liquids and solids that may become liquid during transport as dangerous goods of Class 8, packing group III". This method is described below.

The method involves the following steps:
1) A mixture of 140g of inorganic acid chloride masterbatch pellets and 300 ml of deionised water were mixed in a glass phial.
2) The aforementioned mixture was heated to 55° C. and maintained at temperature under agitation for 3 hours.
3) This mixture was transferred to a conical flask containing a weighed aluminium coupon. The conical flask containing the mixture and the coupon was kept in a water bath at 55° C. for 7 days.
4) After 7 days, the aluminium coupon was removed from the conical flask and weighed in order to calculate percentage loss.
5) The material is classified as corrosive for transport if the % loss of the aluminium coupon was above 13.5%.

The test was carried out on polypropylene pellets containing stannous chloride such as those used in the industry for the manufacture of thermoplastic vulcanisates and on polypropylene pellets containing a functional epoxy silane compound and stannous chloride. The results are shown below.

TABLE 2

% corrosion of an Aluminium coupon (UN C1 Method)

| Sample | Additive | Additive (%) | SnCl$_2$ (%) | Polypropylene (%) | Al start (g) | Al end (g) | Corrosion (% loss) |
|---|---|---|---|---|---|---|---|
| 1 | None | 0 | 45.0 | 55.0 | 5.5180 | 0.000 | 100.0 |
| 2 | 3-glycidoxypropyl trimethoxysilane | 0.9 | 45.0 | 54.1 | 5.5193 | 4.8998 | 11.2 |

In the first sample where there was no silane compound present, the aluminium coupon had completely corroded after the seven-day test. In the second sample where a functional epoxy silane had been combined with the stannous chloride, there was a 0.6 g loss of the 5.5 g coupon giving a percentage loss of 11.2%. A masterbatch with this level of corrosion would not be classified as corrosive under the UN regulations for the transport of dangerous goods; consequently transport costs would be lowered.

Example 3

The silane chemically bonds the stannous chloride to the polymer matrix making the inorganic acid chloride less soluble in water. A test to establish the amount of acid chloride that leached from the masterbatch pellets over 24 hours was used to determine the effectiveness of the two silane compounds with stannous chloride in comparison with a masterbatch without any silane compound addition.

5 g of masterbatch pellets were slurried in 20 ml of deionised water in a glass vial. The glass vial was then stored in an ultrasonic water bath for 24 hours. The slurry of masterbatch pellets was left for 24 hours and then filtered through a 0.45 micron filter. The filtered solution was tested by Inductively Coupled Plasma Atomic Emission Spectrometry for soluble tin. The % tin leached from the masterbatch was then calculated.

TABLE 3

Leached tin from propylene and stannous chloride masterbatches

| Sample | Additive | Additive (%) | SnCl$_2$ (%) | Polypropylene (%) | pH end | Sn ppm | Sn leached (%) |
|---|---|---|---|---|---|---|---|
| 1 | None | 0 | 45.0 | 55.0 | 1.8 | 9237 | 16.0 |
| 2 | n-octyl triethoxysilane | 0.9 | 45.0 | 54.1 | 1.8 | 1231 | 2.1 |
| 3 | 3-glycidoxypropyl trimethoxysilane | 0.9 | 45.0 | 54.1 | 1.6 | 2457 | 4.2 |

The results show that the two silane compounds both reduce the amount of tin leached by over 70% in comparison with a masterbatch without any silane compound addition. The non-functional silane compound used in sample 2, achieves over 80% reduction in tin leaching. The functional epoxy silane compound used in sample 3 achieves 74% reduction in tin leaching.

The inorganic acid chloride is preferably a metal chloride.

What is claimed is:
1. A process for the preparation of a masterbatch, comprising the steps of:
providing an inorganic acid chloride in the form of Stannous Chloride, providing a silane of formula:

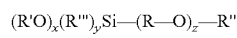

wherein,
y is 0 to 2; x is 3-y and z is 0 or 1;
R is a C$_1$ to C$_{18}$ hydrocarbon;
R' is methyl or ethyl;
R" is a C$_1$ to C$_{18}$ hydrocarbon; and
R'" is a C$_1$ to C$_6$ alkyl group, mixing the inorganic acid chloride with the silane in the presence of water,
drying the resulting composition to produce a coated inorganic acid chloride, mixing the coated inorganic acid chloride with a molten polymer, and producing pellets from the admixture.

2. The process of claim 1 where the polymer is selected from the group consisting of: acrylonitrile butadiene styrene, polybutylene terephthalate, polyethylene terephthalate, polyoxymethylene, urethane, nylon, polycarbonate, PVC, acrylic, polystyrene, polypropylene, polyethylene, and mixtures thereof.

3. A process for the preparation of a silane coated inorganic acid chloride masterbatch, comprising the steps of:
   mixing an inorganic acid chloride in the form of Stannous Chloride with molten polymer, and
   whilst the polymer is in the molten state, reacting the admixture with a silane of formula: $(R'O)_x (R''')_y Si-(R-O)_z-R''$
   wherein,
   y is 0 to 2; x is 3-y and z is 0 or 1;
   R is $C_1$ to $C_{18}$ hydrocarbon;
   R' is methyl or ethyl;
   R" is a $C_1$ to $C_{18}$ hydrocarbon; and
   R''' is a $C_1$ to $C_6$ alkyl group.

4. The process of claim 3, where the silane is selected from the group consisting of:
   $(C_2H_5O)_3Si-R$, wherein R is a C1 to C8 alkyl group;
   $(CH_3O)_3Si-R$, wherein R is a C1 to C8 alkyl group;
   $(C_2H_5O)_2Si-R\ R'$, wherein R and R' are C1 to C8 alkyl groups;
   $(CH_3O)_2Si-R\ R'$, wherein R and R' are C1 to C8 alkyl groups;
   $(C_2H_5O)_3Si-R-Si(C_2H_5O)_3$, wherein R is a C1 to C8 alkyl group;
   $(CH_3)_3Si-R-Si(CH_3O)_3$, wherein R is a C1 to C8 alkyl group; and
   any combinations thereof.

5. The process of claim 4, wherein the silane is selected from the group consisting of: methyltrimethoxysilane, dimethyldimethoxysilane, phenyltrimethoxysilane, methyltriethoxysilane, dimethyldiethoxysilane, phenyltriethoxysilane, n-propyltrimethoxysilane, hexyltrimethoxysilane, octyltriethoxysilane, decyltrimethoxysilane, 1-6 bis (trimethoxysilyl)hexane, trifluropropyltrimethoxysilane, and any combinations thereof.

6. The process of claim 3, where the polymer is selected from the group consisting of: acrylonitrile butadiene styrene, polybutylene terephthalate, polyethylene terephthalate, polyoxymethylene, urethane, nylon, polycarbonate, PVC, acrylic, polystyrene, polypropylene, polyethylene, and mixtures thereof.

7. A masterbatch comprising:
   Stannous Chloride reacted with a silane of formula:

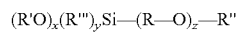

wherein,
   y is 0 to 2; x is 3-y and z is 0 or 1;
   R is $C_1$ to $C_{18}$ hydrocarbon;
   R' is methyl or ethyl;
   R" is a $C_1$ to $C_{18}$ hydrocarbon; and
   R''' is a $C_1$ to $C_6$ alkyl group,
   the so reacted Stannous Chloride being admixed with a polymer selected from the group consisting of: acrylonitrile butadiene styrene, polybutylene terephthalate, polyethylene terephthalate, polyoxymethylene, urethane, nylon, polycarbonate, PVC, acrylic, polystyrene, polypropylene, polyethylene, and mixtures thereof, the masterbatch comprising from 1 to 80% Stannous Chloride by weight.

8. The masterbatch of claim 7, wherein the Stannous Chloride is in the form of particles of approximate average diameter from 10 to 500μm and is reacted substantially only on its surface with the silane.

9. The masterbatch of claim 8, wherein the surface of the Stannous Chloride is completely reacted with silane to provide a surface coating.

* * * * *